United States Patent [19]

Mogamiya

[11] Patent Number: 5,706,051
[45] Date of Patent: Jan. 6, 1998

[54] COMPACT OPTICAL SYSTEM FOR ELECTRONIC CAMERA

[75] Inventor: Makoto Mogamiya, Tokyo, Japan

[73] Assignee: Asahi Kogaku Kogyo Kabushiki Kaisha, Tokyo, Japan

[21] Appl. No.: 462,689

[22] Filed: Jun. 5, 1995

[30] Foreign Application Priority Data

Jun. 8, 1994 [JP] Japan .................. 6-148751

[51] Int. Cl.⁶ .................................. H04N 5/225
[52] U.S. Cl. ................ 348/337; 348/340; 348/341
[58] Field of Search ................ 348/335, 337, 348/341, 340

[56] References Cited

U.S. PATENT DOCUMENTS

| | | | |
|---|---|---|---|
| 4,757,387 | 7/1988 | Saito | 348/341 |
| 4,853,787 | 8/1989 | Kurth | 348/341 |
| 5,294,990 | 3/1994 | Aoki | 348/363 |
| 5,459,511 | 10/1995 | Uehara et al. | 348/341 |

*Primary Examiner*—Wendy Garber
*Attorney, Agent, or Firm*—Greenblum & Bernstein, P.L.C.

[57] ABSTRACT

An electronic camera includes a camera body, a plurality of image pickup devices which are immovably positioned in the camera body, a photographing optical system and a finder optical system. An optical element is provided and is movable with respect to the finder optical system and the image pickup devices between a first position in which a bundle of light transmitted through the photographing optical system is made incident upon the finder optical system, and a second position in which the bundle of light transmitted through the photographing optical system is split and the split beams are made incident onto the image pickup devices.

20 Claims, 8 Drawing Sheets

Fig. 7

| R | B | R | B | - - - |
| R | B | R | B | - - - |
| R | B | R | B | - - - |
| R | B | R | B | - - - |
| ¦ | ¦ | ¦ | ¦ | |

Fig. 8

| G | G | G | G | - - - |
| G | G | G | G | - - - |
| G | G | G | G | - - - |
| G | G | G | G | - - - |
| ¦ | ¦ | ¦ | ¦ | |

COMPACT OPTICAL SYSTEM FOR ELECTRONIC CAMERA

BACKGROUND OF THE INVENTION

1. Field of the Invention

The present invention relates to an electronic camera having a plurality of image pickup devices.

2. Description of Related Art

There is known a two-plate type electronic camera having two image pickup devices (CCD's). In such a known two-plate type electronic camera, a beam splitter which is made of, for example, a prism having a beam splitting layer is provided behind a photographing lens to split incident light transmitted through the photographing lens into two bundles of beams which are then made incident upon the two CCD's.

In the case that a TTL-type finder is provided in the camera, it is necessary to provide a quick return mirror between the photographing lens and the beam splitter to make the light transmitted through the photographing lens incident upon a finder optical system.

There is also a known beam splitter which is made of a prism which splits light transmitted through the photographing lens into three bundles of light in three directions to thereby make the beams of light incident upon two CCD's and the finder optical system.

However, due to the presence of the quick return mirror between the photographing lens and the beam splitter, the optical path length from the photographing lens to the light receiving surfaces of the CCD's becomes long, and hence, the photographing lens must have a long back focal distance (back focus). This results in an increase in the axial length and diameter of the photographing lens, thus leading to an increase in the size of a camera as a whole.

Moreover, the beam splitter to split the incident light beam into three directions is so large that the optical path length from the photographing lens to the light receiving surfaces of the CCD's becomes long. Consequently, the axial length and diameter of the photographing lens are increased, thus resulting in an increase in the size of a camera as a whole. In addition to the foregoing, since the incident light transmitted through the photographing lens can be always received by the CCD's even when no picture is taken, the light receiving surfaces of the CCD's can be scorched. To prevent the CCD's from being damaged or becoming defective, it is necessary to reduce the aperture (diaphragm or stop) in accordance with the quantity of light. Consequently, the quantity of light to be made incident upon the finder optical system is reduced so that an optical image of an object to be taken becomes undesirably dark.

SUMMARY OF THE INVENTION

It is an object of the present invention to provide a small electronic camera in which the photographing lens can be miniaturized.

To achieve the object mentioned above, according to one aspect of the present invention, there is provided an electronic camera including a camera body, a plurality of image pickup devices which are immovably provided in the camera body, a photographing optical system, a finder optical system, and an optical element which is movable with respect to the finder optical system and the image pickup devices. The optical element is moveable between a first position in which a bundle of light transmitted through the photographing optical system is made incident upon the finder optical system and a second position in which said bundle of light transmitted through the photographing optical system is split and the split beams are provided onto the image pickup devices.

Preferably, a provision is made for a detecting device for detecting the displacement of the optical element, so that the movement of the optical element can be controlled in accordance with the detection signal of the detecting device.

In a preferred embodiment, assuming that there are three different directions, x, y and z, the optical element is comprised of a first stage of a cemented prism which is provided with a beam splitting surface which is adapted to split a bundle of light transmitted through the photographing optical system in the direction x, into two directions of x and y, and a second stage of the cemented prism which is provided with a reflecting surface which is adapted to reflect a bundle of light transmitted through the photographing optical system in the direction x, toward the direction z.

Preferably, when the optical element is located in the first position, the reflecting surface of the second stage of the cemented prism is located on the optical path of the bundle of light transmitted through the photographing optical system, and when the optical element is located in the second position, the beam splitting surface of the first stage of the cemented prism is located on the optical path of the bundle of light transmitted through the photographing optical system, respectively.

The beam splitting surface and the reflecting surface are preferably located with an angular phase difference of 90 degrees with respect to the optical axis of the photographing optical system.

The first and second image pickup devices can be provided with light receiving surfaces opposed to the corresponding side surfaces of the optical element.

Preferably, the optical element is located in the second position only when a picture is taken.

The optical element can be comprised of a prism assembly having a plurality of prisms.

According to another aspect of the present invention, there is provided an electronic camera including a camera body; a photographing optical system; a plurality of image pickup devices which are immovably provided in the camera body, the image pickup devices being arranged normal to a plane which includes an optical axis of the photographing optical system; a finder optical system having an optical axis which is different from the optical axis of the photographing optical system; and, an optical element which is movable with respect to the photographing optical system and the finder optical system, between a first position and a second position. The optical element has a light reflecting surface which reflects a bundle of light transmitted through the photographing optical system toward the finder optical system when the optical element is located at the first position and a beam splitting surface which splits the bundle of light transmitted through the photographing optical system and provides the split beams onto the image pickup devices respectively when the optical element is located at the second position.

The present disclosure relates to subject matter contained in Japanese patent application No.06-148751 filed on Jun. 8, 1994 which is expressly incorporated herein by reference in its entirety.

BRIEF DESCRIPTION OF THE DRAWINGS

The invention will be described below in detail with reference to the accompanying drawings, in which;

FIG. 7 is a schematic view of a first CCD by way of example, according to the present invention;

FIG. 8 is a schematic view of a second CCD by way of example, according to the present invention;

DESCRIPTION OF THE PREFERRED EMBODIMENT

Figure 1:
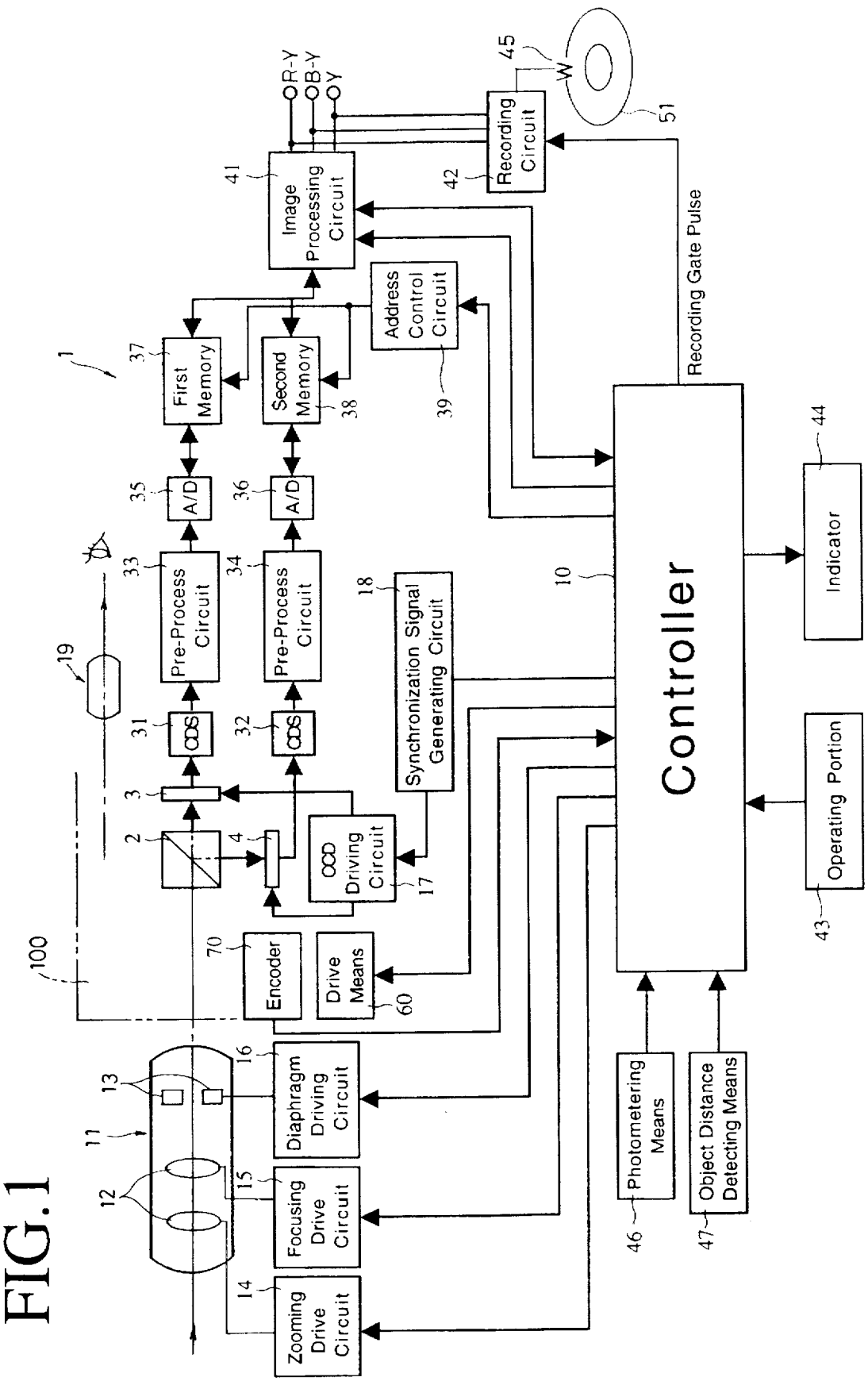
FIG. 1 is a block diagram of an electronic camera according to the present invention.

As can be seen in FIG. 1, a camera according to the present invention is essentially comprised of a camera body 100, a photographing optical system 11, a finder optical system 19, a prism assembly 2 as an optical element, a first image pickup device (CCD) 3, a second image pickup device (CCD) 4, a control means 10, a CCD driving circuit 17, a synchronization signal generating circuit 18, and an address control circuit 39.

The photographing optical system 11 includes a plurality of photographing lens groups 12 which are movable in the optical axis direction, and a diaphragm or stop 13. The diaphragm 13 is provided with a plurality of blades which are rotated or moved by a diaphragm driving circuit 16 to vary the aperture thereof.

The first CCD 3 is connected at its output end to a correlative double sampling circuit (CDS) 31 which is in turn connected at the output end thereof to a pre-processing circuit 33. The pre-processing circuit 33 is connected to an A/D converter 35 which is in turn connected to a first memory 37.

The second CCD 4 is connected at its output end to a correlative double sampling circuit (CDS) 32 which is in turn connected at the output end thereof to a pre-processing circuit 34. The pre-processing circuit 34 is connected to an A/D converter 36 which is in turn connected to a second memory 38. The first memory 37 and the second memory 38 are connected to an image processing circuit 41 which is in turn connected at the output end to a recording circuit 42.

The control means (controller) 10 is comprised of a microcomputer (CPU) which Generally performs various control functions in the electronic camera 1, including controlling the movement of a prism assembly 2 which will be discussed hereinafter, sequence control, calculation of the exposure, automatic exposure control, and automatic focus control.

An operating portion 43 and an indicator 44 are connected to the control means 10. The operating portion 43 includes a main power switch, a release switch, and a zoom switch to vary the focal length of the photographing lens assemblies 12 in the case that the latter form a zoom lens, etc., in accordance with need.

The indicator 44 includes, for example, a liquid crystal display (LCD) or a light emitting diode in which the ON/OFF state of the main switch, photographing data including a photographing date, etc., a zoom magnification, and the current time, etc., are selectively indicated.

The electronic camera 1 also includes a zooming drive circuit 14, a focusing drive circuit 15, a diaphragm driving circuit 16, a photometer 46 for measuring a luminance, and an object distance measuring meter 47. The photometer 46 detects luminance or brightness of an object to be taken in accordance with a bundle of light transmitted through the finder optical system 19. The luminance data is supplied to the controller 10. The object distance measuring meter 47 directly detects the object distance between the electronic camera 1 and the object to be taken, or detects a focus deviation, which is the amount of defocus with respect to a predetermined focal surface. The focal surface in the present invention are the light receiving surfaces of CCD's 3 and 4 in the electronic camera 1. The object distance data is supplied to the controller 10.

The release switch is in the form of a two-step switch. When the release switch is turned ON by a first step, the photometer 46 and the object distance detecting meter 47 are actuated, and when the release switch is turned ON by a second step, the first and second CCD's 3 and 4 are driven by the CCD driving circuit 17 to take a picture.

The zooming drive circuit 14 has a drive motor which is adapted to move the variable power lens groups 12 of the photographing optical system 11 to a predetermined position to vary the focal length toward the wide angle side or the telephoto side. The zooming drive circuit 14 operates in accordance with the operation of the zoom switch.

The focusing drive circuit 15 has a focusing motor. When the focusing drive circuit 15 receives a focusing command signal which is supplied from the controller 10 to which the object distance data is input from the distance detecting meter 47, the drive circuit 15 rotates the focusing motor by a predetermined amount to move the focusing lenses of the photographing lens groups 12. Thus, the focusing operation is completed.

The diaphragm drive circuit 16 has a drive motor (not shown). The controller 10 performs an exposure calculation to determine optimum diaphragm value and shutter speed. The shutter speed is the time for which electric charges are accumulated in the CCD's 3 and 4. The diaphragm value and the shutter speed are calculated in accordance with luminance data of the object which is supplied from the photometer 46 to the controller 10. Consequently, a command signal is input to the diaphragm control circuit 16 to set the optimum diaphragm value obtained. The diaphragm drive circuit 16 drives the drive motor by a predetermined amount in accordance with the command signal to drive the shutter blades of the diaphragm 13.

The internal structure of the prism assembly 2, and the first and second CCD's 3 and 4 in the electronic camera 1 will be discussed below with reference to FIGS. 2 through 6.

In the following discussion, it is assumed that the optical axis of the photographing optical system 11 corresponds to an x-axis in orthogonal x-y-z coordinates in which the directions indicated by arrows refer to "positive directions".

Figure 2:
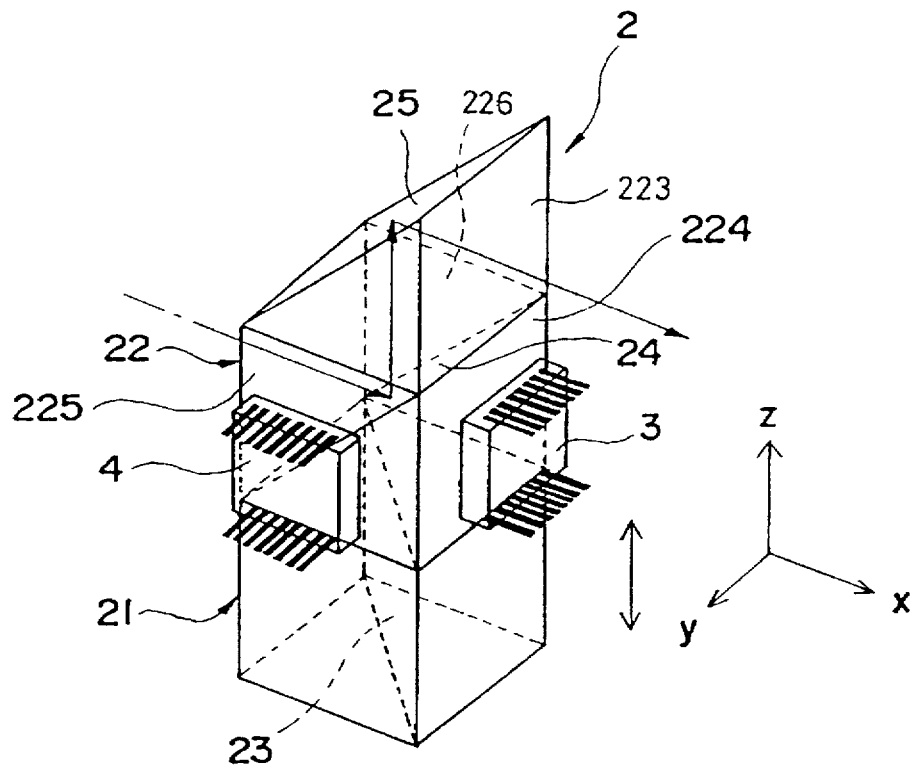
FIG. 2 is a perspective view of a prism assembly used in an electronic camera shown in a first position (lower position), according to the present invention.
Figure 3:
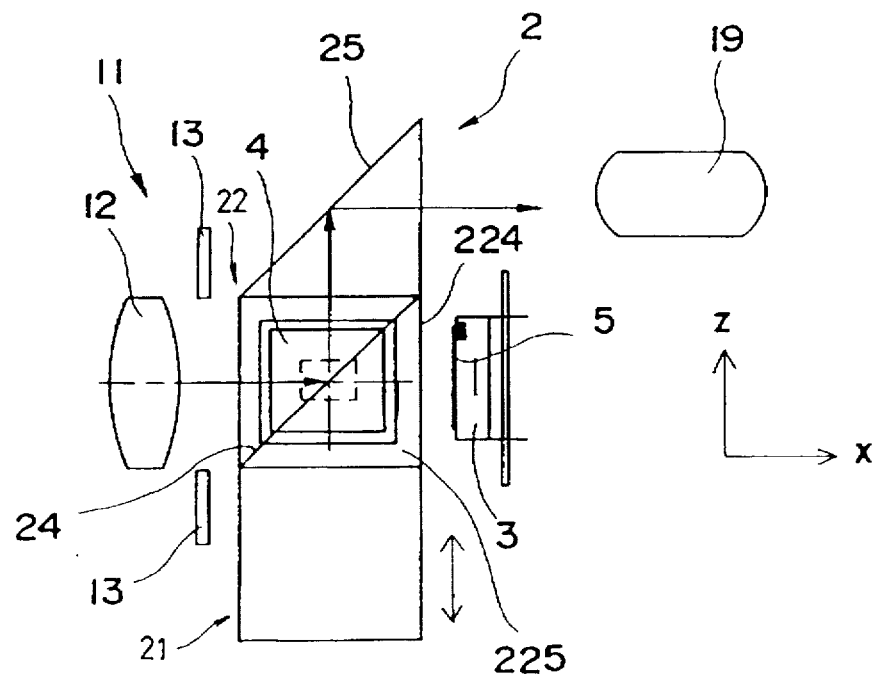
FIG. 3 is a side elevational view of a prism assembly shown in FIG. 2.
Figure 4:
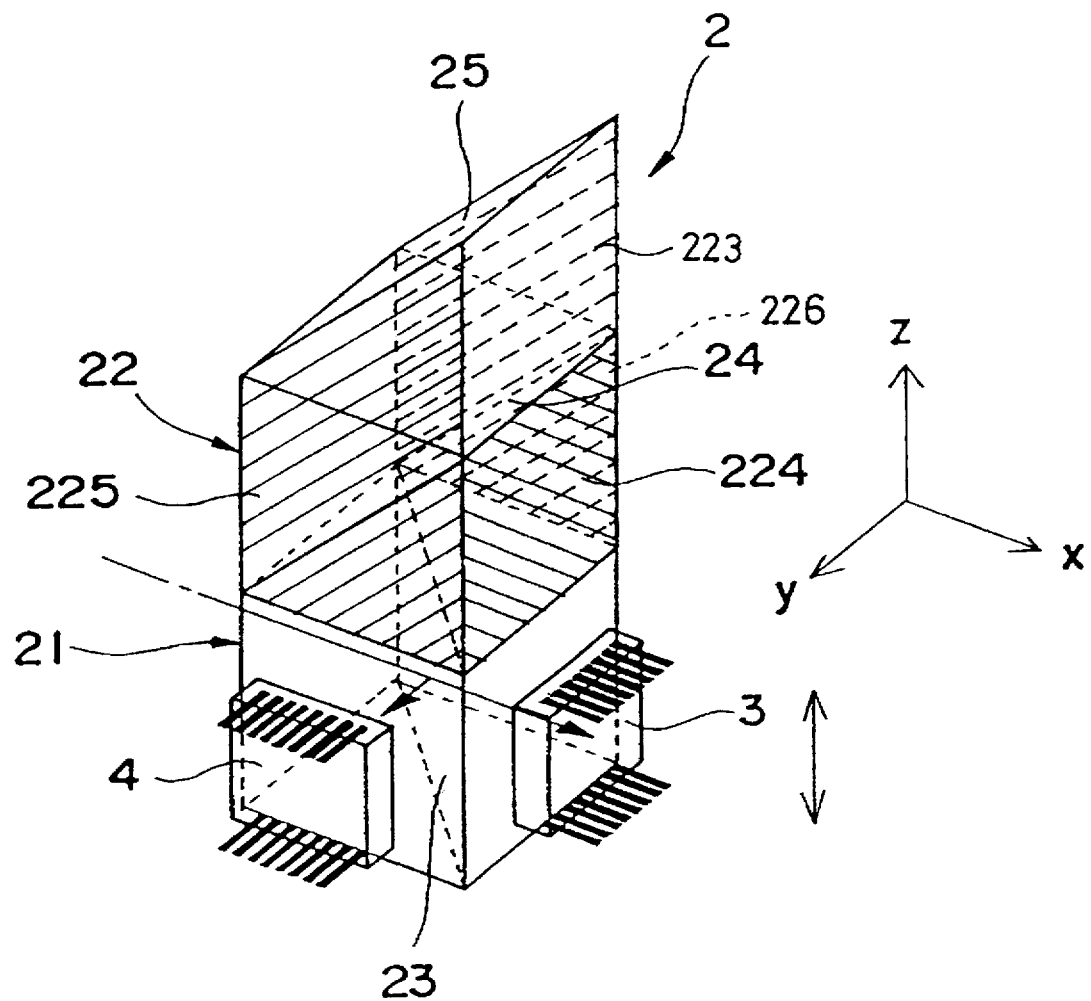
FIGS. 4, 5 and 6 are a perspective view, a side elevational view, and a plan view of a prism assembly used in an electronic camera shown in a second position (upper position), respectively, according to the present invention.
Figure 5:
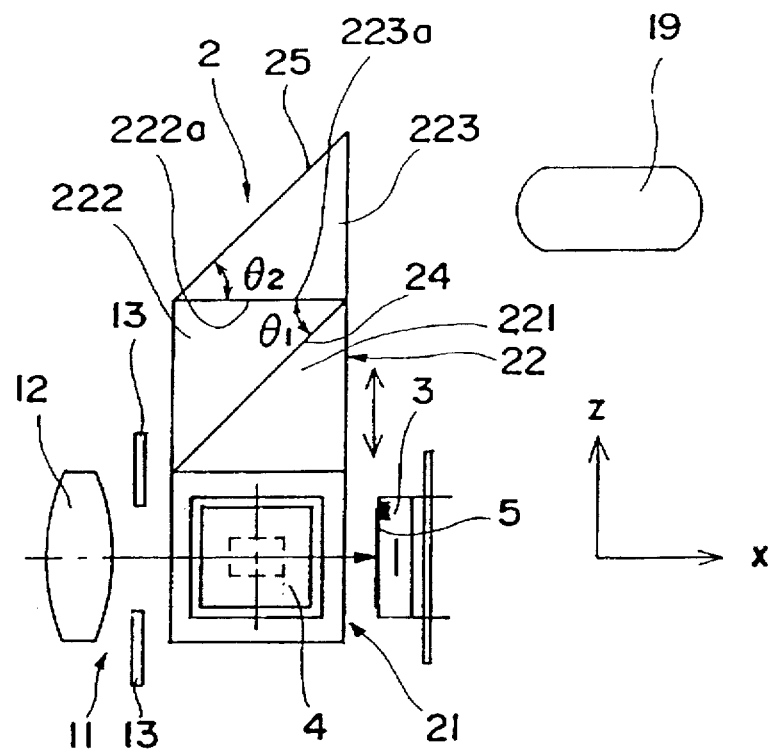
Figure 6:
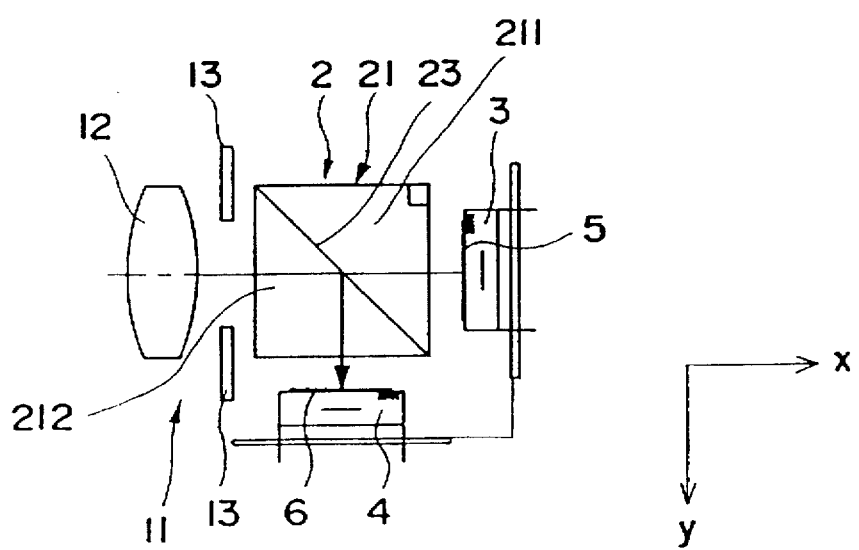

The prism assembly 2 is supported to move in the z-axis direction. FIGS. 2 and 3 show the lower position (first position) of the prism assembly, and FIGS. 4 through 6 show the upper position (second position), respectively. The CCD's 3 and 4 and the photographing optical system 11 are not movable.

The prism assembly 2 functions as a beam splitter and a light reflector. The prism assembly 2 is comprised of a lower cemented prism 21 which is adapted to provide the bundle of light transmitted through the photographing optical system 11 onto the first and second CCD's 3 and 4, and an upper cemented prism 22 which is adapted to make the bundle of light transmitted through the photographing optical system 11 incident upon the finder optical system 19. The upper prism 22 is adhered to the lower prism 21.

As shown in FIG. 6, the lower prism 21 is made of two right-angle prism elements 211 and 212 having side surfaces of a right isosceles triangle. The prism elements 211 and 212 are cemented to each other at their oblique surfaces, the surfaces which include the bases of the right isosceles triangles). One of the oblique surfaces is provided with a half mirror to define a half mirror surface 23 which acts as beam splitting surface.

As can be seen in FIGS. 4 and 6, the bundle of light transmitted through the photographing optical system 11 incident upon the lower cemented prism 21 (in the x-direction) is split into two bundles of light by the half mirror surface 23. The bundle of light reflected by the half mirror surface 23 in the y-direction is converged onto the light receiving surface of the second CCD 4, and the bundle of light transmitted through the half mirror surface 23 in the x-direction is incident upon the light receiving surface of the first CCD 3.

The upper cemented prism 22 is made of three right-angle prism elements 221, 222 and 223. The oblique surface of one of the prism elements 221 and 222 is provided with a total reflection film to define a total reflection surface 24, as can be seen in FIGS. 2 and 5.

The right-angle prism element 223 is located at the end of the prism 22 in the z direction, i.e., the upper end in FIG. 5, and the right-angle prism elements 223 and 222 are cemented to each other at the surfaces 223a and 222a thereof. The oblique surface of the right-angle prism element 223 is provided with a total reflection film to define a total reflection surface 25 which lies substantially parallel with the total reflection surface 24.

The half mirror surface 23 of the lower prism 21 and the total reflection surface 24 of the upper prism 22 have a phase difference of 90 degrees with respect to the optical axis (x-axis) of the photographing optical system 11. Namely, the total reflection surface 24 of the upper prism 22 lies in a plane parallel with a plane which is obtained by rotating the half mirror surface 23 of the lower prism 21 by 90 degrees about the optical axis of the photographing optical system 11.

The surfaces 224, 225 and 226 of the upper prism 22, other than the light incident surface and the light emitting surface through which the light is emitted toward the finder optical system 19, are coated with a light intercepting paint. The painted surfaces are shown as hatched surfaces FIG. 4.

As can be seen in FIGS. 2 and 3, the bundle of light transmitted through the photographing optical system 11 incident upon the upper cemented prism 22 (in the x-direction is reflected in the z-direction by the total reflection surface 24 and is then reflected in the x-direction by the total reflection surface 25. Namely, the light is shifted in parallel in the positive z-direction (upward direction in FIGS. 2 and 3) by a predetermined distance, so that the light reaches the finder optical system 19. Note that the prism assembly 2 is made of, for example, various plastics or resin materials or glass, etc.

Figures 7, 8:
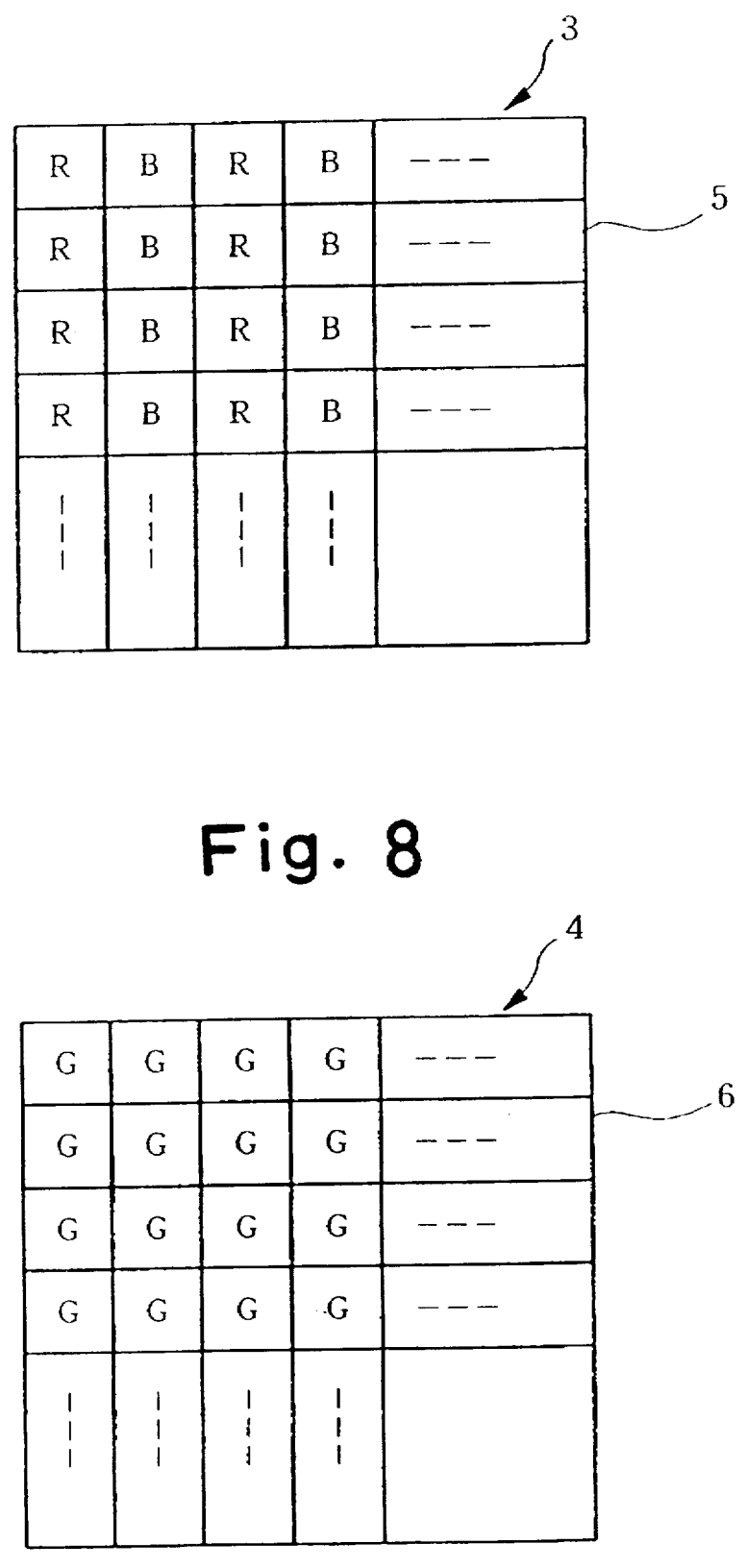

FIGS. 7 and 8 schematically show the structure of the first and second CCD's 3 and 4, by way of example. In FIGS. 7 and 8, the first and second CCD's 3 and 4 are each comprised of a number of picture elements in a matrix arrangement. Each picture element accumulates electric charges corresponding to the amount of light received and successively transfers the accumulated charges at a predetermined time. The first and second CCD's 3 and 4 are driven by the CCD drive circuit 17.

The light receiving surface of the first CCD 3 is provided with an R or B stripe filter 5 to separate a red component (R) and a blue component (B). Namely, the picture elements of the first CCD 3 belonging to the first column are provided with the R stripe filters 5 to separate the R component, and the picture elements of the first CCD 3 belonging to the second column are provided with the B stripe filters 5 to separate the B component. Similarly, the picture elements of the first CCD 3 belonging to the subsequent odd-number columns and subsequent even-number columns are provided with the R filters and the B filters, respectively.

The light receiving surface of the second CCD 4, that is, each picture element of the second CCD 4 is provided with a green filter (G filter) 6 to separate a green component.

As shown in FIG. 6, the first and second CCD's 3 and 4 are arranged such that their light receiving surfaces lie in planes parallel with the y-z plane and x-z plane, respectively. In other words, these light receiving surfaces are normal to x-y plane which includes x-axis. The prism assembly 2 is arranged such that its side surfaces are parallel with the light receiving surfaces of the first and second CCD's 3 and 4. The centers of the first and second CCD's 3 and 4 are located substantially on an extension of the optical axis of the photographing optical system 11. Furthermore, the light receiving surfaces of the first and second CCD's 3 and 4 are optically conjugate with each other through the half mirror surface 23.

Figure 9:
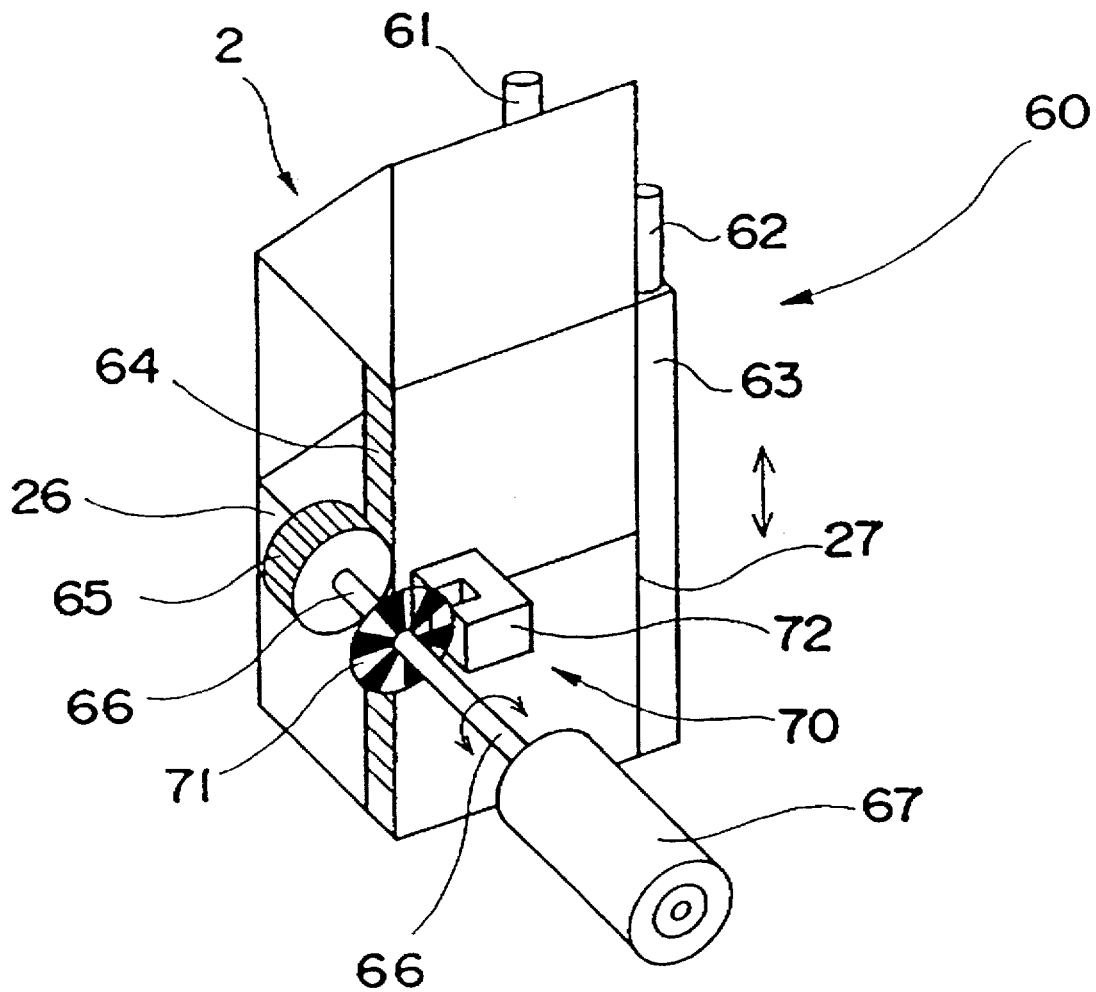
FIGS. 9 and 10 are perspective views of a driving means for moving a prism assembly, shown in different positions, according to the present invention; and, FIG. 11 is a flow chart of operations of a control means when a release switch is turned ON, according to the present invention.
Figure 10:
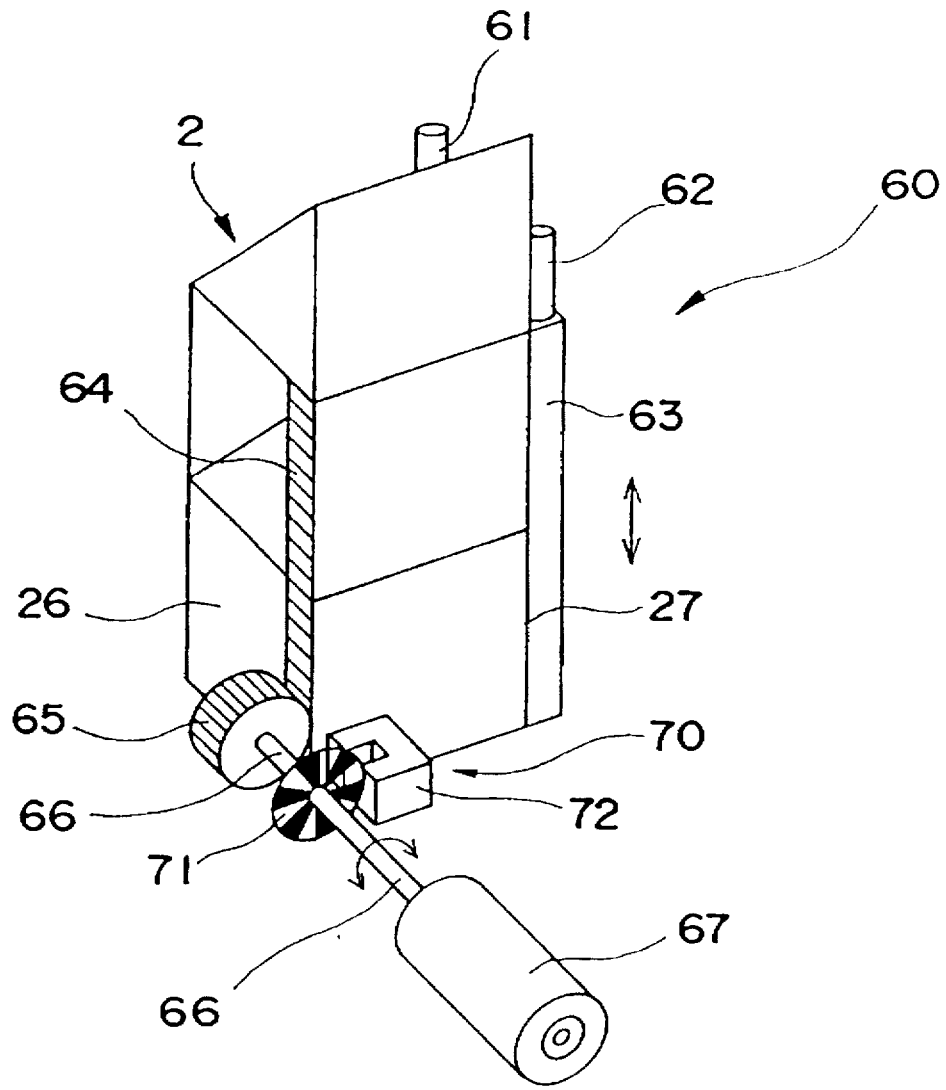

The following discussion will be addressed to the driving means 60 for moving the prism assembly 2 (FIGS. 9 and 10).

Referring to FIG. 9, there are a pair of guide members 61 and 62 in the form of a bar extending in the z-direction in the camera body. A slider 63 is provided on the side surface 27 of the prism assembly 2 opposite to the side surface 26 that is opposed to the light receiving surface of the second CCD 4. The slider 63 is provided with a pair of through holes in which the guide bars 61 and 62 are inserted, so that the slider 63 can be slid along the guide bars 61 and 62 in the z-direction.

The side surface 26 of the prism assembly 2 is provided on the edge thereof adjacent to the first CCD 3 with a gear rack 64 which extends in the z-direction. A pinion 65 which is secured to an output shaft 66 of the DC motor 67 for moving the prism assembly 2 is in mesh with the rack 64. The motor 67 is connected to and controlled by the controller 10.

The output shaft 66 of the DC motor 67 is provided with an encoder 70. The encoder 70 is comprised of a circular disc 71 which is provided with light intercepting portions and transmissive portions, that are alternately located at a predetermined angular distance, and a photointerrupter 72 which detects the number of revolutions of the circular disc 71. The encoder 70 constitutes a displacement detecting means (not shown) for detecting the displacement of the prism assembly 2 with respect to a predetermined reference position. The photointerrupter 72 is connected to the controller 10, as shown in FIG. 1.

The electronic camera 1 as constructed above operates as follows.

As shown in FIGS. 2 and 3, when a picture is not being taken i.e., the camera is a viewing position, the release switch at the second step is also not being actuated. The prism assembly 2 is located in the lower position (first position) in accordance with the control of the driving means 60. In this state, the diaphragm 13 is in a fully open position.

When the prism assembly 2 is in the lower position, the bundle of light transmitted through the photographing optical system 11 in the x-direction is made incident upon the upper prism 22; reflected by the total reflection surface 24 in the z-direction; reflected by the total reflection surface 25 in the x-direction; and made incident upon the finder optical system 19: Since the surfaces 224, 225 and 226 of the upper prism 22 other than the incident and emitting surfaces thereof are provided with the light intercepting layers, as mentioned above, no light is incident upon the first and second CCD's 3 and 4, and hence no scorch or destruction of the CCD's occurs.

When the release switch is actuated by the first step, the predetermined operations, such as a measurement of the object luminance or the automatic focusing, are carried out, as mentioned above. Thereafter, when the release switch is actuated by the second step upon taking a picture, the prism assembly driving motor 67 is driven in accordance with the control of the controller 10, as shown in FIG. 10, so that the output shaft 66 Of the drive motor 67 is rotated in the counterclockwise direction in FIG. 10. As a result, the pinion 65 is rotated, so that the rotation of the pinion 65 is converted to a linear movement of the prism assembly 2 through the engagement of the rack 64 and the pinion 65. Consequently, the prism assembly 2 is moved in the positive z-direction (upward direction in FIG. 10) along the guide bars 61 and 62.

The position of the prism assembly 2 is detected by the encoder 70. Namely, the rotation of the output shaft 66 causes the circular disc 71 of the encoder 70 to rotate, so that the pulse signals corresponding to the number of revolutions or angular displacement, of the circular disc 71 are supplied from the photointerrupter 72 of the encoder 70 to the controller 10. The controller 10 counts the number of the pulses input thereto. When the number of the pulses reaches a predetermined value N which represents the distance between the lower position and the upper position of the prism assembly 2, the controller 10 stops the motor 67. Consequently, the prism assembly 2 is moved to and stopped at the upper position (second position).

The diaphragm 13 is driven by the diaphragm driving circuit 16 so as to obtain an optimum diaphragm value. The movement (amount of movement) of the diaphragm is controlled by an encoder (not shown) similar to the encoder 70. It is also possible to control the movement of the prism assembly 2 and the diaphragm 13 in an open loop using pulse motors.

As can be seen in FIGS. 4, 5 and 6, when the prism assembly 2 is in the upper position, the bundle of light transmitted through the photographing optical system 11 in the x-direction is incident upon the lower cemented prism 21 and is split by the half mirror surface 23. The bundle of light reflected by the half mirror surface 23 in the y-direction reaches the light receiving surface of the second CCD 4. The bundle of light transmitted through the half mirror surface 23 travels in the x-direction and reaches the light receiving surface of the first CCD 3. Thus, object images are formed on the light receiving surfaces of the first and second CCD's 3 and 4.

Since the R/B stripe filters 5 are provided on the light receiving surface of the first CCD 3, electric charges corresponding to the R component and the B component of the bundle of light incident thereupon from the photographing optical system 11 are accumulated in the photodiodes of the first CCD 3.

Since the G filter 6 is provided on the light receiving surface of the second CCD 4, electric charges corresponding to the G component of the incident light transmitted through the photographing optical system 11 are accumulated in the photodiodes of the second CCD 4.

Upon completion of the photographing operation, i.e., when the exposure or charge accumulation of the first and second CCD's 3 and 4 is completed, the controller 10 rotates the prism assembly driving motor 67 and accordingly the output shaft 66 thereof in the reverse direction by a predetermined amount, so that the prism assembly 2 is moved to the negative z-direction (downward direction in FIG. 9) along the guide bars 61 and 62, as shown in FIG. 9.

In this operation, when the number of the pulses supplied to the controller 10 is a predetermined value N, the controller 10 stops the motor 67. As a result, the prism assembly 2 is stopped at the lower position, as shown in FIG. 9. The diaphragm 13 is moved to a fully open position by the diaphragm driving circuit 16.

Figure 11:
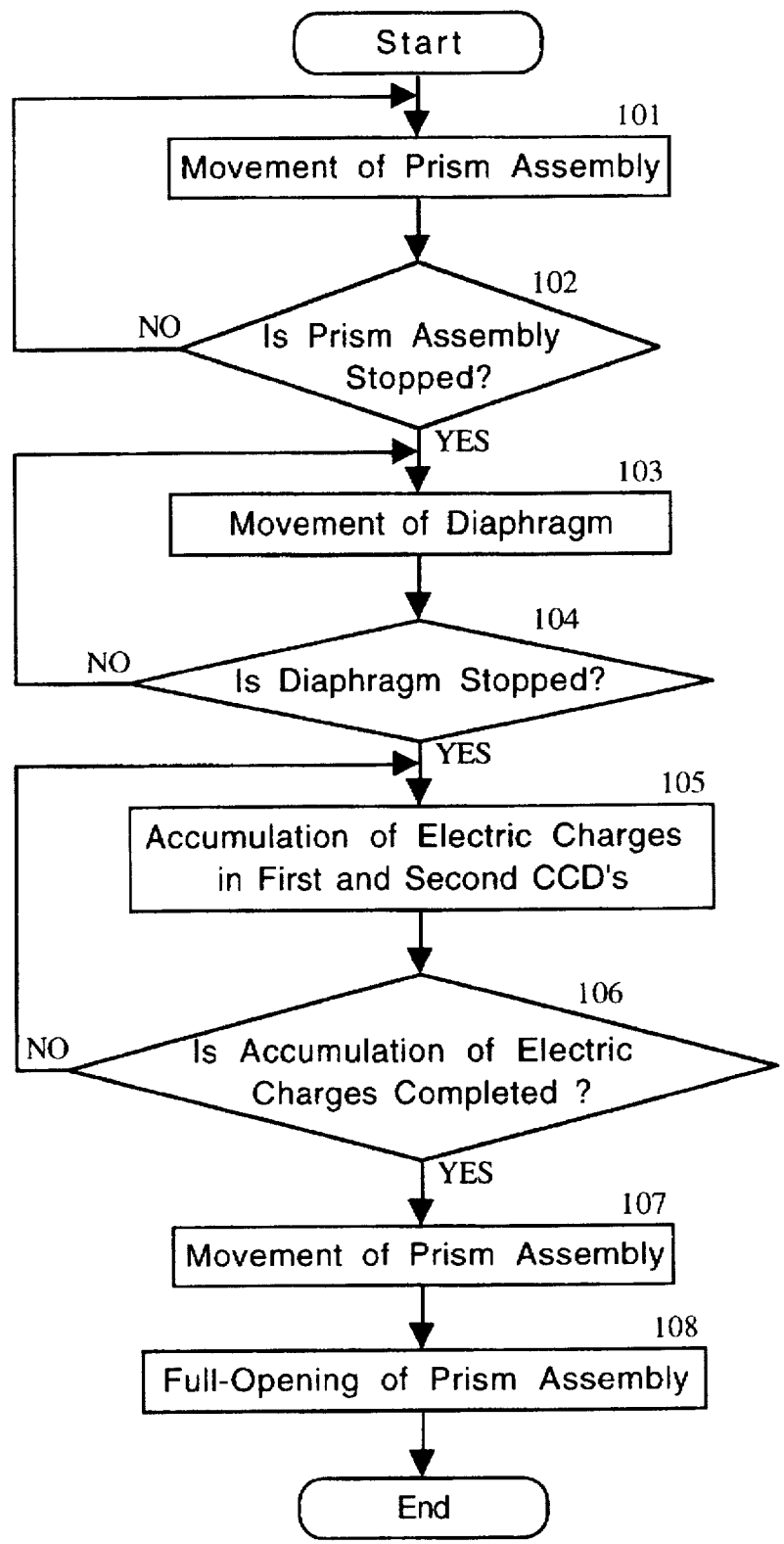

FIG. 11 shows a flow chart of the operations of the controller 10 after the release switch is turned ON. When the release switch is actuated by the second step, the prism assembly 2 is moved from the lower position shown in FIG. 3 to the upper position shown in FIG. 5, as mentioned before (step 101).

Thereafter, whether the prism assembly 2 is stopped is checked in accordance with the pulse signals supplied from the encoder 70 (step 102). Namely, the number of the pulses is N is checked at step 102. If it is detected that the prism assembly 2 is stopped, the diaphragm 13 is driven to establish an appropriate diaphragm value (aperture) at step 103.

Thereafter, the driving of the diaphragm 13 is completed and is checked at step 104. If the diaphragm 13 is stopped, unnecessary electric charges accumulated in the photodiodes of the first and second CCD's 3 and 4 are swept. Electric charges are then accumulated in the first and second CCD's 3 and 4 for the time determined in accordance with the object luminance data as mentioned above (step 105).

Thereafter, whether the accumulation of the charges is completed and is checked (step 106). If the accumulation is completed, the control proceeds to step 107 to move the prism assembly 2 to the lower position shown in FIG. 3 from the upper position shown in FIG. 5. Thereafter, the diaphragm 13 is moved to a fully open position (step 108). Consequently, the program ends.

As can be understood from the above discussion, the prism assembly 2 is movable with respect to the first and second CCD's 3 and 4 between the first position (lower position) in which the bundle of light transmitted through the photographing lens 12 of photographing optical system 11 is made incident upon the finder optical system 19, and the second position (upper position) in which the bundle of light is provided onto the first and second CCD's 3 and 4, in the electronic camera 1 according to the present invention. Therefore, the optical path length from the photographing lens 12 to the light receiving surfaces of the first and second CCD's 3 and 4 can be reduced in comparison with a known electronic camera having a beam splitter which splits a bundle of light transmitted through a photographing lens into three bundles of light to be made incident upon two CCD's and a finder optical system, or a known electronic camera having a quick return mirror provided between a photographing lens and a beam splitter.

Consequently, the axial length and diameter of the photographing lens 12 or the displacement of the photographing lens can be decreased, thus resulting in a realization of a small and light camera having a compact photographing unit. Moreover, the manufacturing cost of the camera can be reduced because a small photographing lens or photographing unit to be incorporated therein.

In addition to the foregoing, since no light from the photographing lens 12 reaches the first and second CCD's 3 and 4 when no picture is taken, it is possible to prevent the CCD's from being scorched or damaged by the incident light without need for an adjustment of the amount of light transmitted through the photographing lens. Consequently, the diaphragm 13 making up the aperture can be fully opened when no picture is taken.

Furthermore, since no picture, is being taken the bundle of light transmitted through the photographing lens 12 and made incident upon the prism assembly 2 can all be made incident upon the finder optical system 19. The diaphragm 13 is fully opened, thus a bright object image can be obtained.

Furthermore, since there is no change in the relative positional relationship between the first and second CCD's 3 and 4 that are secured to the camera body, no displacement of the first and second CCD's whose position has been precisely determined occurs, and hence, a high resolution can be obtained.

The electric charges (image signals) accumulated in the first and second CCD's 3 and 4 during the photographing operation are processed and recorded as follows.

As shown in FIG. 1, the CCD driving circuit 17 drives the first CCD 3 and the second CCD 4 in accordance with horizontal and vertical synchronization signals supplied from a synchronization signal generating circuit 18 which is controlled by the controller 10. Consequently, the electric charges (image signals) accumulated in the first and second CCD's 3 and 4 are input to correlative double sampling (CDS) circuits 31 and 32.

Reset noise components of the R primary color signal and the B primary color signal input from the first CCD 3 are removed in the CDS circuit 31. Thereafter, the R and B color signals are supplied to a pre-processing circuit 33 where the necessary operations including a γ correction are carried out.

The R and B color signals are converted to digital R and B color signals by an A/D converter 35 and then are temporarily stored in a first memory 37 at predetermined addresses. The addresses of the first memory 37 at which the digital R and B color signals are to be stored are controlled by the controller 10 through an address control circuit 39.

Similarly, the reset noise components of the G primary color signal input from the second CCD 4 are 20 removed in the CDS circuit 32. Thereafter, the G color signals are supplied to a pre-processing circuit 34 where the necessary operations including a γ correction are carried out.

The G color signals are converted to digital G color 25 signals by an A/D converter 36 and are then temporarily stored in a second memory 38 at predetermined addresses. The addresses of the second memory 38 at which the digital G color signals are to be stored are controlled by the controller 10 through the address control circuit 39.

The digital R and B color signals stored in the first memory 37 at predetermined addresses are read therefrom and sent to an image processing circuit 41. Similarly, the digital G color signals stored in the second memory 38 at predetermined addresses are read therefrom and sent to the image processing circuit 41.

The image processing circuit 41 performs predetermined processes to obtain brightness signals (Y=R+G+B) and color difference signals (R-Y) and (B-Y). These signals are input to a monitor (not shown).

The brightness signals (Y) and the color difference signals (R-Y) and (B-Y) are input to a recording circuit 42. The recording circuit 42 performs an operation for recording, so that the image signals can be recorded on predetermined tracks of a recording disc (magnetic recording medium) 51 which rotates, through a magnetic head 45. The image processing circuit 41 and the recording circuit 42 are controlled by the controller 10.

The present invention is not limited to the illustrated embodiment.

For instance, although the cemented surfaces of the right-angle prism elements 211 and 212 of the lower cemented prism 21 of the prism assembly 2 define the half mirror surface 23, it is possible to use, as the lower prism 21, a color separating prism, such as a dichroic prism which is provided with a dichroic surface (dichroic multilayered film surface) provided on the cemented surfaces of the prism elements 211 and 212 to reflect the G component and permit the R and B components to pass therethrough.

In this alternative, when the prism assembly 2 is located in the upper position, the G component of light transmitted through the photographing lens 12 is reflected by the dichroic surface and converged onto the light receiving surface of the second CCD 4, and the R and B components are transmitted through the dichroic surface and converged onto the light receiving surface of the first CCD 3, respectively.

Although the right-angle prism elements 222 and 223 of the upper cemented prism 22 have angles θ1 and θ2 shown as 45 degrees in the illustrated embodiment, as shown in FIG. 5, the angles θ1 and θ2 are not limited to 45 degrees. Namely, the angles θ1 and θ2 can be optionally selected so long as the bundle of light transmitted through the photographing optical system 11 is made incident upon the finder optical system 19.

Although there are two CCD's in the illustrated embodiment, it is possible to provide three CCD's. Moreover, each CCD can be of three-plate type or four-plate type, so that the number of optical paths to be obtained by splitting is three or four.

Although the magnetic disc is used as the recording medium in the illustrated embodiment, an optical recording medium, an opto-magnetic recording medium, or an IC memory card, etc., can be used.

I claim:

1. An electronic camera, comprising:

a camera body;

a plurality of image pickup devices immovably positioned in said camera body;

a photographing optical system;

a finder optical system; and an optical element movable, with respect to said finder optical system and said plurality of image pickup devices, between a first position in which a bundle of light transmitted through said photographing optical system is made incident upon said finder optical system and a second position in which said bundle of light transmitted through said photographing optical system is split into beams, said split beams being made incident onto each of said plurality of image pickup devices, said optical element being formed so that a plane formed by said bundle of incident light to said finder optical system is normal to a plane formed by said bundle of incident light to each of said plurality of image pickup devices.

2. An electronic camera according to claim 1, further comprising detecting means for detecting a displacement of said optical element, so that the movement of said optical element can be controlled in accordance with a detection signal outputted by said detecting means.

3. An electronic camera according to claim 1, wherein, if there are three different directions, x, y and z, said optical element is comprised of a first stage of a cemented prism which is provided with a beam splitting surface which is adapted to split said bundle of light transmitted through said photographing optical system in the x-direction, into x and y directions, and a second stage of said cemented prism which is provided with a reflecting surface which is adapted to reflect said bundle of light transmitted through said photographing optical system in the x-direction, toward the z-direction.

4. An electronic camera according to claim 3, wherein said x, y and z directions comprise an orthogonal coordinate system, one of said x, y and z directions being an optical axis of said photographing optical system.

5. An electronic camera according to claim 3, wherein when said optical element is located in said first position, said reflecting surface of said second stage of said cemented prism is located on an optical path of said bundle of light transmitted through said photographing optical system, and when said optical element is located in said second position, said beam splitting surface of said first stage of said cemented prism is located on the optical path of said bundle of light transmitted through said photographing optical system, respectively.

6. An electronic camera according to claim 5, wherein said beam splitting surface and said reflecting surface are located with an angular phase difference of 90 degrees with respect to said optical axis of the photographing optical system.

7. An electronic camera according to claim 2, wherein said first and said second image pickup devices are provided with light receiving surfaces opposed to said corresponding side surfaces of the optical element.

8. An electronic camera according to claim 1, wherein said optical element is located in said second position only when a picture is taken.

9. An electronic camera according to claim 1, wherein said optical element is comprised of a prism assembly having a plurality of prisms.

10. The electronic camera of claim 1, wherein said first position comprises a light tight position, such that no light is transmitted from said photographing optical system through said optical element to said plurality of image pickup devices when said optical element is positioned at said light tight position.

11. An electronic camera, comprising:

a camera body;

a photographing optical system;

a plurality of image pickup devices immovably provided in said camera body, one of said plurality of image pickup devices being arranged normal to a plane which includes an optical axis of said photographing optical system, another of said plurality of image pickup devices being arranged parallel to said optical axis and normal to said one of said plurality of image pickup devices;

a finder optical system having an optical axis which is different from said optical axis of said photographing optical system; and an optical element movable, with respect to said photographing optical system and said finder optical system, between a first position and a second position, said optical element having a light reflecting surface which reflects a bundle of light transmitted through said photographing optical system toward said finder optical system when said optical element is located at said first position and a beam splitting surface which splits said bundle of light transmitted through said photographing optical system into beams that are made incident onto each of said plurality of image pickup devices when said optical element is located at said second position, such that a plane formed by said bundle of light incident onto said finder optical system is normal to a plane formed by said beams of incident onto each of said plurality of image pickup devices.

12. An electronic camera according to claim 11, wherein said optical element is comprised of a prism assembly having a plurality of prisms.

13. An electronic camera according to claim 12, wherein if x, y and z directions define orthogonal coordinates, with orthogonal coordinate, one of the directions x, y and z being the optical axis of said photographing optical system, said optical element is comprised of a first stage of a cemented prism which is provided with said beam splitting surface which is adapted to split a bundle of light transmitted through said photographing optical system in the x-direction into two beams extending in x and y directions, and a second stage of said cemented prism which is provided with said reflecting surface which is adapted to reflect a bundle of light transmitted through said photographing optical system in the x-direction, toward the z-direction.

14. The electronic camera of claim 10, wherein said first position comprises a light tight position, such that no light is transmitted from said photographing optical system through said optical element to said plurality of image pickup devices when said optical element is positioned at said light tight position.

15. An imaging device, comprising:

an image pickup device;

an optical system;

a finder; and a optical element that is selectively moved between a first position and a second position, said optical element preventing light transmitted through said optical element from being incident onto said image pickup device when said optical element is in said first position and permitting light transmitted through said optical element to be incident onto said image pickup device when in said second position.

16. The imaging device of claim 15, said optical element comprising at least one light splitting surface and at least one light reflecting surface.

17. The imaging device of claim 15, wherein said optical element is moved to said second position only when an imaging operation is performed.

18. The imaging device of claim 15, wherein said imaging device comprises an electronic camera.

19. The imaging device of claim 15, wherein light transmitted through said optical system to said finder is transmitted through said optical element in a direction normal to a plane formed by light transmitted to said image pickup device.

20. The imaging device of claim 15, further comprising:

a detector that detects a displacement of said optical element, so that a movement of said optical element between said first position and said second position is controlled in accordance with a detection signal produced by said detector.

* * * * *